United States Patent
Miller et al.

(10) Patent No.: US 10,843,451 B2
(45) Date of Patent: Nov. 24, 2020

(54) NOZZLE SYSTEM WITH MONOLITHIC NOZZLE HEAD FOR FUSED FILAMENT FABRICATION ADDITIVE MANUFACTURING AND METHOD OF MANUFACTURING SAME

(71) Applicant: Cosine Additive inc., Houston, TX (US)

(72) Inventors: Jason Miller, Houston, TX (US); Andrew McCalip, Houston, TX (US)

(73) Assignee: Cosine Additive Inc., Houston, TX (US)

( * ) Notice: Subject to any disclaimer, the term of this patent is extended or adjusted under 35 U.S.C. 154(b) by 0 days.

(21) Appl. No.: 16/834,669

(22) Filed: Mar. 30, 2020

(65) Prior Publication Data
US 2020/0230943 A1    Jul. 23, 2020

Related U.S. Application Data

(63) Continuation of application No. 15/250,320, filed on Aug. 29, 2016, now Pat. No. 10,611,138.

(60) Provisional application No. 62/211,001, filed on Aug. 28, 2015.

(51) Int. Cl.
| | |
|---|---|
| *B33Y 30/00* | (2015.01) |
| *B29C 64/20* | (2017.01) |
| *B29C 64/106* | (2017.01) |
| *B29K 105/00* | (2006.01) |
| *B33Y 10/00* | (2015.01) |

(52) U.S. Cl.
CPC ............ *B33Y 30/00* (2014.12); *B29C 64/106* (2017.08); *B29C 64/20* (2017.08); *B29K 2105/253* (2013.01); *B33Y 10/00* (2014.12)

(58) Field of Classification Search
CPC .......... B33Y 30/00; B33Y 10/00; B29C 64/20
See application file for complete search history.

(56) References Cited

U.S. PATENT DOCUMENTS

| | | |
|---|---|---|
| 2005/0225000 A1 | 10/2005 | Tabassi |
| 2012/0121748 A1 | 5/2012 | Planta Torralba et al. |
| 2016/0031159 A1* | 2/2016 | Church ................... B29C 64/20 264/308 |

OTHER PUBLICATIONS

Filch, Ernest C., "Proactive Maintenance for Mechanical Systems," 1992, FES, p. 207.

* cited by examiner

*Primary Examiner* — Jacob T Minskey
*Assistant Examiner* — Melody Tsui
(74) *Attorney, Agent, or Firm* — Blank Rome LLP

(57) ABSTRACT

A nozzle system and method of manufacturing a nozzle system for use in an additive manufacturing system for fabricating an object is disclosed. The nozzle system includes a monolithic nozzle head designed such that the thermal locking member, neck member, and nozzle member of the nozzle head are manufactured into one component. The nozzle head is made of a material that has a high specific heat capacity but low thermal heat conductivity. The result is a nozzle system design that virtually eliminates heat migration from the nozzle head to the heat sink, and thereby improves the overall quality of polymer filament deposition during printing.

14 Claims, 5 Drawing Sheets

NOZZLE SYSTEM WITH MONOLITHIC NOZZLE HEAD FOR FUSED FILAMENT FABRICATION ADDITIVE MANUFACTURING AND METHOD OF MANUFACTURING SAME

CROSS REFERENCE TO RELATED APPLICATION(S)

This application is a continuation of U.S. patent application Ser. No. 15/250,320, filed on Aug. 29, 2016, issued on Apr. 7, 2020 as U.S. Pat. No. 10,611,138, which claims priority to U.S. provisional patent application No. 62/211,001, filed on Aug. 28, 2015, both of which are hereby incorporated herein by reference in their entireties.

GOVERNMENT SPONSORSHIP

None.

FIELD OF THE INVENTION

Embodiments are in the field of additive manufacturing. More particularly, embodiments disclosed herein relate to nozzle systems for use in an additive manufacturing system for fabricating an object and methods of manufacturing same via utilizing a monolithic nozzle head which, inter alia, foster superior and consistent heating and deposition of polymer filament during additive manufacturing, greatly improving the quality of 3-D printing.

BACKGROUND

Additive manufacturing, colloquially called "3-D printing," is an emerging technology that has the potential to completely transform modern manufacturing processes. In the most common conventional manufacturing processes, an object is manufactured by cutting/shearing components of the object from a material, followed by a shaping process that may include bending or molding. These processes are labor intensive and costly. Additive manufacturing bypasses these drawbacks by printing the object directly to its final form. The printing technology is fairly straightforward. An industrial robot is controlled by a computer to print a three-dimensional object from a computer model by depositing and curing plastics, metals, ceramics, or a combinational thereof layer-by-layer on a flat surface.

There are numerous benefits to additive manufacturing over conventional manufacturing processes. First, because additive manufacturing is based on computerized models, there is virtually no limit to the types and complexity of objects that can be printed, so long as the object does not exceed the physical limitations of the materials and the printer, such as the dimensions of the printing surface. Second, complex objects can be printed in one job as one object, eliminating typical labor-intensive and high cost post-fabrication assembly processes. Third, additive manufacturing does not require any production of specialized tools, which are a significant cost associated with conventional manufacturing processes. Fourth, additive manufacturing offers customization at almost no additional cost, since end-user personalization can be met simply by modifying the computerized model of the object prior to printing. Fifth, additive manufacturing creates less waste, since objects are manufactured in essentially final form and with high precision, avoiding the cutting and reshaping that are a necessary feature of conventional manufacturing processes. Sixth, additive manufacturing allows for the creation of multi-density or multi-material objects that would be impossible through any other manufacturing means.

Fused filament fabrication (FFF) is one type of additive manufacturing that is gaining rapid popularity in prototyping, modeling, and production applications. In FFF operation, a polymer filament is pulled from a storage mechanism, often times a cylindrical spool, into a printing head, called an extrusion nozzle. A toothed gear drive pushes the filament at a controlled rate into the nozzle head, which is heated. As the filament moves through the nozzle head it melts and is extruded from the nozzle head in the form of beads. As the beads pass the nozzle head they contact ambient air and immediately cool and harden as they are being deposited onto the print surface. The nozzle head is controlled by a computer to move along the X-Y axes, while the table surface is controlled to move along the Z-axis. The nozzle and table follow a routine that is based on a computer design of an object so as to print the object from bottom-to-top, layer-by-layer.

The single most critical component in FFF additive manufacturing is the nozzle system. The nozzle system can effect and dictate printing speed, accuracy, and precision. FIGS. 1A-1B illustrate two representative prior art nozzle systems 100, 101. FIG. 1A depicts an example of a Teflon-lined J-Head nozzle system 100, which includes a cold end called the heat sink 120, and a hot end called the nozzle head 160. An inner bore 138 traverses the heat sink 120 and nozzle head 160, and is sized to receive a polymer filament 110. The purpose of the heat sink 120 is to maintain the polymer filament 110 at room temperature and thus in its most solid form up until the point it makes contact with the nozzle head 160. The heat sink 120 is separated from the nozzle head 160 by what's called a "thermal break" 150. The purpose of the thermal break 150 is to distance the heat sink 120 from the nozzle head 160 so that the heat sink 120 is shielded from heat that migrates from the nozzle head 160 during printing. In the J-Head nozzle system 100, the inner bore 138 is coated with TEFLON® to ensure that the filament 110 passes through the bore 138 smoothly, and to ensure that heat is not inadvertently passed on to the filament 110 as it is fed through the heat sink 120. The nozzle head 160 includes a heater block 192 and is often made of aluminum or brass. The nozzle head 160 also includes a temperature changing resistor (thermistor) (see thermistor mounting location 193) for taking temperature measurements. FIG. 1B depicts an example of an all-metal nozzle system 101. This system similarly includes a cold heat sink end and a hot nozzle head end separated by a thermal break 151. In this nozzle system 101, however, the inner chamber is made of steel and the nozzle head 161 is made of brass. No TEFLON® exists in this variant of design.

Current FFF nozzles, such as those described above, suffer from numerous drawbacks. Most nozzle systems on the market are made from either aluminum or brass, which are low cost materials that very efficiently conduct heat. However, in FFF, heat conduction actually works as a detriment to high performance. Specifically, due to the high conductivity of these materials, heat can very easily and quickly migrate from the nozzle head to the heat sink through the thermal break region. The unintended result is that the polymer filament can be warmed in the heat sink before it enters the nozzle head. If the temperature in the filament rises to a critical value, the plastic softens dramatically before it ever reaches the nozzle head. This results in a poor grip of the toothed drive wheel as it drives the filament through the heat sink. This also leads to an uneven flow of material into the nozzle head or, in the worst case, a total system jam. Furthermore, due to heat migration, conventional nozzle systems made of brass or aluminum cannot operate at high temperatures, limiting the types of polymer filament materials that can be used for printing. Finally, brass and aluminum are soft materials with low yield strengths and poor hardness, so they tend to deteriorate quickly as a side effect of the additive manufacturing process. This deterioration process is accelerated by abrasive additives that could be contained within the filament.

Another problem with prior art nozzle systems is their reliance on TEFLON® in the inner bore 138 of the heat sink 120, such as the nozzle system 100 depicted in FIG. 1A. Currently, most nozzle systems use TEFLON® in the inner bore due to its slippery nature and low heat conductance. TEFLON® works well for temperatures below 250° C. At higher temperatures, however, the TEFLON® begins to toxically decompose. This drawback limits the types of polymer filaments that can be used for printing, including high-performance plastics. The prior art nozzle system 101 depicted in FIG. 1B does not use TEFLON® in the inner bore 139 of the heat sink 123. However, while this design is capable of printing higher temperature polymers, it is more prone to heat migration through the thermal break, thus causing a softening of the polymer filament 111 within the heat sink 123 before reaching the nozzle head 161 and ultimately leading to jamming and clogging of the nozzle system 101.

Yet another drawback of conventional nozzle systems is their inability to maintain a consistent temperature in the nozzle head, which ultimately leads to repeatability issues. Most nozzles use a temperature changing resistor ("thermistor") to measure and track the nozzle head temperature. A thermistor is a glass encapsulated bead that must be mechanically attached on the external face of the nozzle. Because the thermistor is positioned externally, it is subject to ambient air flow, poor contact, and slow transient response, all of which lead to gross errors in temperature readings. Errors in temperature readings make it difficult to maintain the nozzle head at a consistent temperature. If the nozzle head temperature fluctuates, the consistency of the filament may fluctuate causing variance in the quality of deposited layers. Additionally, thermistors are inconsistently mounted from nozzle to nozzle. Because each nozzle head is therefore unique, each machine necessarily requires temperature settings that are tailored to the particular nozzle head used in the machine. This uniqueness introduces an error quantity that has to be accounted for by a human operator, thus reducing the overall system performance and reliability.

In prior art nozzle systems, the nozzle head, heater block, heat sink, and thermal break are coupled via mechanical interfaces such as threads and clamps. These components are often made up of different materials. There are a number of drawbacks in this design. Thermal cycling caused by the additive manufacturing process can eventually loosen the threads causing molten plastic to weep out of the nozzle head, thereby interfering with the polymer deposition and quality of the print job. Furthermore, the varying expansion rates of the materials in these threads and clamps causes gaps to form in these components. Melted polymer filament can become trapped in these gaps, causing jams in the filament feed mechanism and along remaining portions of the filament path.

With the combination of the afore-mentioned prior art drawbacks, prior art nozzle systems tend to have very poor system reliability. In FFF additive manufacturing, however, reliability must be at a minimum of three sigma (99.7%) to achieve an acceptable printing performance. This reliability requirement is necessary in light of the nature of additive manufacturing, where one print job may involve hundreds of hours of printing and the process is zero-fault tolerant. Thus, there is need in the art for nozzle systems for FFF additive manufacturing that can achieve a substantially high and consistent system reliability.

Thus, it is desirable to provide a nozzle system for use in an additive manufacturing system for fabricating an object and method of manufacturing same that are able to overcome the above disadvantages.

Advantages of the present invention will become more fully apparent from the detailed description of the invention hereinbelow.

SUMMARY OF THE INVENTION

Embodiments are directed to a nozzle system for use in an additive manufacturing system for fabricating an object. The nozzle system comprises a heat sink having a heat sink proximate end and a heat sink distal end. The nozzle system also comprises a nozzle head having a nozzle head proximate end and a nozzle head distal end. The nozzle head comprises a thermal locking member positioned at the nozzle head proximate end. The nozzle head also comprises a neck member. The nozzle head further comprises a nozzle member positioned at the nozzle head distal end. The nozzle member is joined to the thermal locking member via the neck member. The thermal locking member is connected to the heat sink at the heat sink distal end. An outer diameter of the neck member is less than outer diameters of the thermal locking member and the nozzle member. A combination of the thermal locking member, the neck member, and the nozzle member is monolithic.

Embodiments are also directed to a method of manufacturing a nozzle system for use in an additive manufacturing system for fabricating an object. The method comprises providing a heat sink having a heat sink proximate end and a heat sink distal end. The method also comprises monolithically forming a nozzle head having a nozzle head proximate end and a nozzle head distal end. The nozzle head comprises a thermal locking member positioned at the nozzle head proximate end. The nozzle head also comprises a neck member. The nozzle head further comprises a nozzle member positioned at the nozzle head distal end. The nozzle member is joined to the thermal locking member via the neck member. The method further comprises connecting the thermal locking member to the heat sink at the heat sink distal end. An outer diameter of the neck member is less than outer diameters of the thermal locking member and the nozzle member. The step of monolithically forming the nozzle head comprises monolithically forming the thermal locking member, the neck member, and the nozzle member in combination.

Additional embodiments and additional features of embodiments for the nozzle system and method of manufacturing the nozzle system are described below and are hereby incorporated into this section.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the inventive concepts disclosed herein are not limited to the precise arrangements and instrumentalities shown in the figures.

DETAILED DESCRIPTION

Figure 1B:
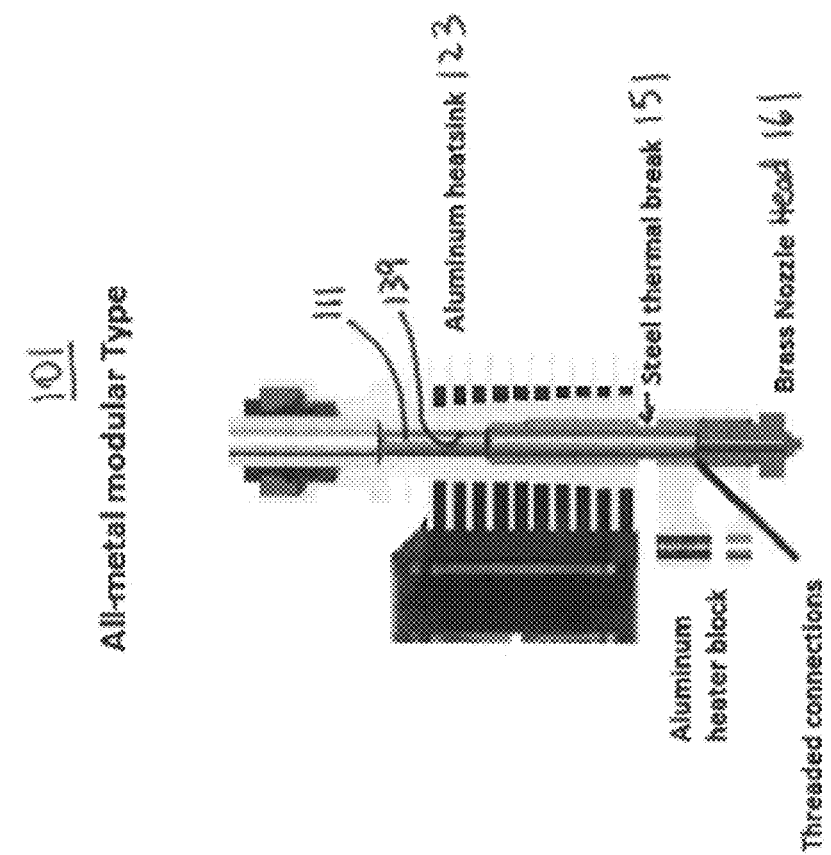
FIGS. 1A-1B illustrate cross-sectional side views of prior art nozzle systems used in FFF additive manufacturing.
Figure 1A:
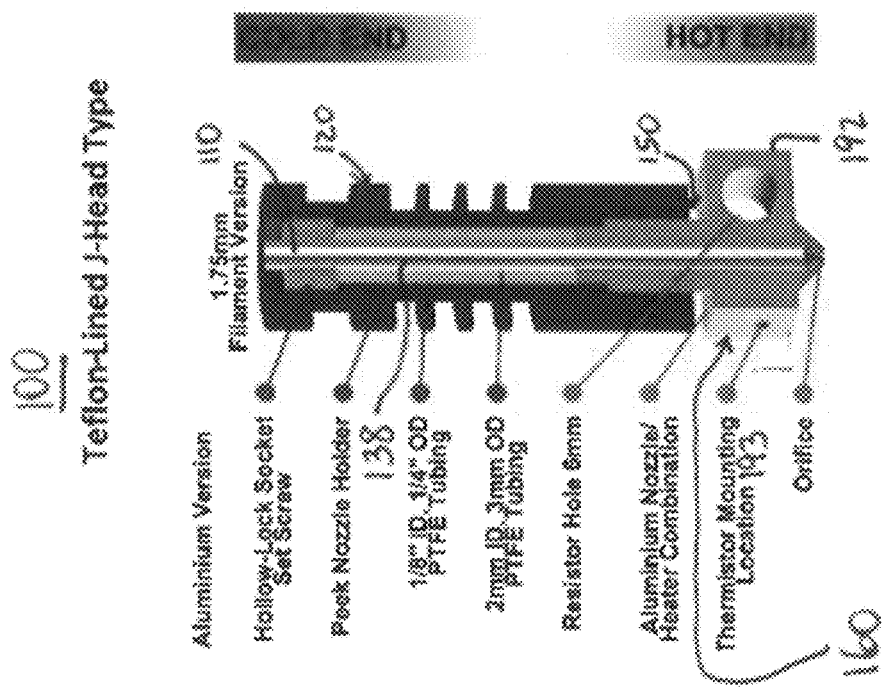

It is to be understood that the figures and descriptions of the present invention may have been simplified to illustrate elements that are relevant for a clear understanding of the present invention, while eliminating, for purposes of clarity, other elements found in a typical nozzle system for use in an additive manufacturing system for fabricating an object or typical method of manufacturing a nozzle system for use in an additive manufacturing system for fabricating an object. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Before explaining at least one embodiment in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented systems, methods, features, and advantages will be or become apparent to one with skill in the art upon examining the drawings and the detailed description herein. It's intended that all such additional systems, methods, features, and advantages be protected by the accompanying claims.

This application is directed to nozzle systems with monolithic nozzle heads that can be used in FFF additive manufacturing. Generally, the monolithic nozzle head is designed such that the thermal locking member, neck member, and nozzle member of the nozzle head (and optionally the heating block) are manufactured into one component. The nozzle head is made of a material that has a high specific heat capacity but low thermal heat conductivity. The result is a nozzle system design that virtually eliminates heat migration from the nozzle head to the heat sink, and thereby improves the overall quality of polymer filament deposition during printing.

Figure 2:
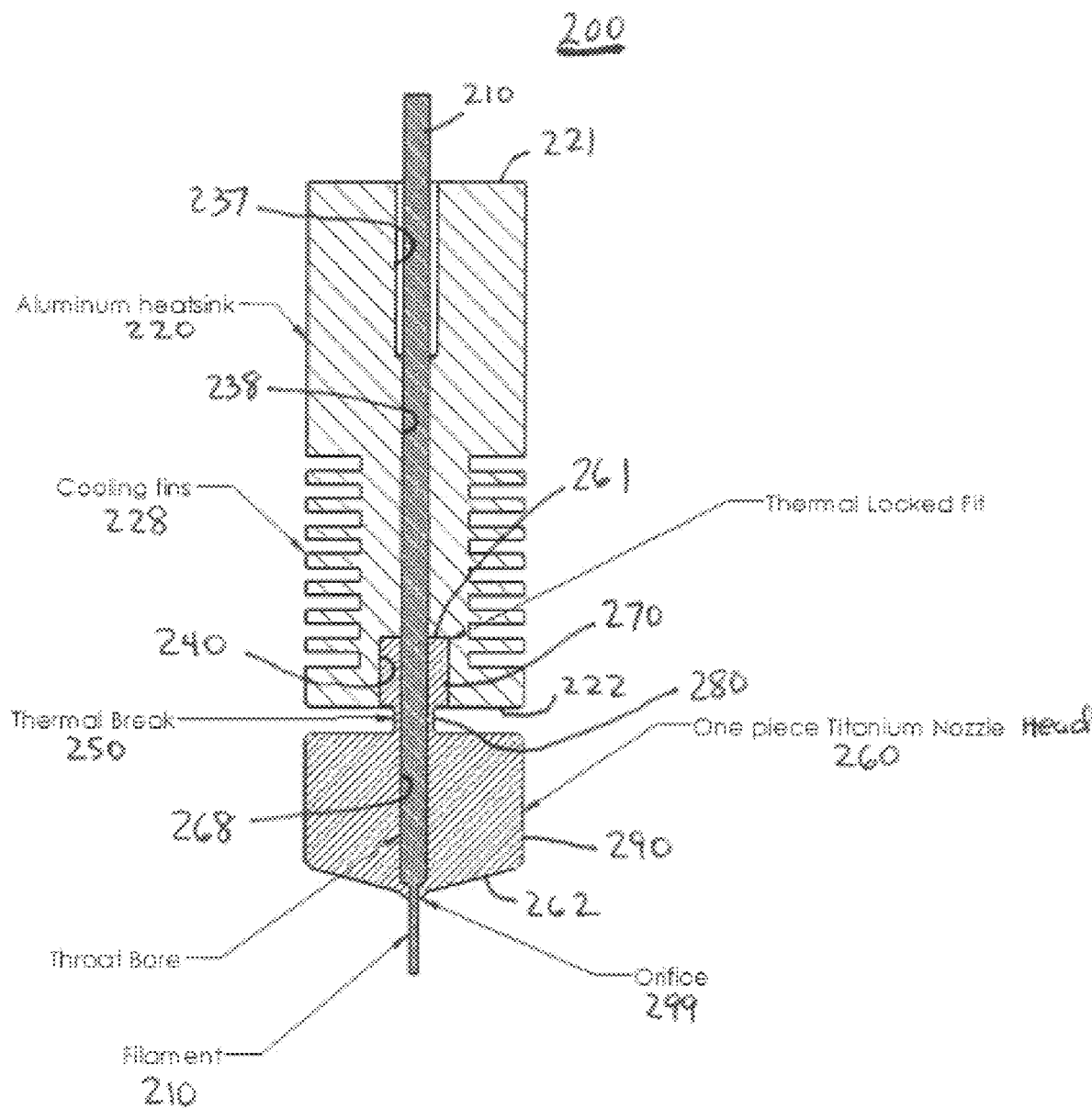
FIG. 2 is a cross-sectional side view of a nozzle system with a monolithic nozzle head, in accordance with an embodiment.

FIG. 2, by way of example only, is a cross-sectional side view of one embodiment of a nozzle system 200 with a monolithic nozzle head 260 that can be used in FFF additive manufacturing. As illustrated, the nozzle system 200 generally includes three major portions: a heat sink 220, a nozzle head 260, and a thermal break 250 therebetween.

In one embodiment, the heat sink 220 is made entirely of aluminum. In another embodiment, the heat sink 220 is made of one or more materials capable of acting as a heat sink, including but not limited to copper, brass, carbon steel, stainless steel, titanium, or Inconel®. The heat sink 220 includes a proximal end 221 and a distal end 222. In one embodiment, the heat sink 220 can be designed with cooling fins 228 on the external surface of the heat sink 220 and positioned in the distal half of the heat sink 220. The cooling fins 228 can increase the heat transfer coefficient between the heat sink 220 and ambient air. Additionally, the proximal end 221 of the heat sink 220 can include a threaded connection 237, which can connect the nozzle system 200 to any standard extruder device. Furthermore, the distal end 222 of the heat sink 220 includes a thermal locking bore 240, which is designed to secure the nozzle head 260.

The heat sink 220 includes an inner bore 238 that spans the heat sink 220 from its proximal end 221 to the thermal locking bore 240. In one embodiment, the inner bore 238 passes through the threaded connection 237 at the proximal end 221 of the heat sink 220 so that when an extruder is connected to the heat sink 220 the inner bore 238 of the heat sink 220 is continuous with an inner bore of the extruder. The inner bore 238 of the heat sink 220 is sized to receive a polymer filament 210, which can be fed into the heat sink's inner bore 238 by an extruder (not illustrated) beginning at the heat sink's proximal end. The inner bore 238 of the heat sink 220 can be manufactured to accommodate a particular filament size. In one embodiment, the inner bore 238 is designed to be slightly larger than the filament, by approximately 0.1 mm to 1 mm clearance value. In another embodiment, the inner bore 238 can be the same material as the heat sink 220 (e.g., aluminum). Alternatively, the inner bore 238 may be coated with a high temperature low friction film or surface modification.

The heat sink 220 is designed to maintain the heat sink inner bore 238 at ambient temperature at all times during the FFF additive manufacturing process. Thus, as a polymer filament 210 is fed into the heat sink's inner bore 238 from the extruder, the heat sink 220 ensures that the polymer filament 210 remains at room temperature ensuring the polymer filament 210 remains in its most solid form up until the point that the filament 210 enters the heated space of the nozzle head 260. Without the heat sink 220, heat emanating from the nozzle head 260 into the surrounding environment would migrate through the thermal break 250 region and melt the filament 210 before it entered the nozzle head 260, which would result in uneven flow of filament 210 into the nozzle head 260, reducing the quality of the print and potentially causing clogging or jamming.

In an embodiment, the nozzle head 260 of the nozzle system 200 is one monolithic piece that includes three members: a thermal locking member 270, a neck member 280, and a nozzle member 290. The thermal locking member 270 is positioned at a proximal end 261 of the nozzle head 260. The nozzle member 290 is positioned at a distal end 262 of the nozzle head 260 and is joined to the thermal locking member 270 via the neck member 280. An inner bore 268 spans the nozzle head 260 from the proximal end 261 to the distal end 262. The inner bore 268 of the nozzle head 260 is designed to be the same size and shape as the inner bore 238 of the heat sink 220. Accordingly, when the heat sink 220 is coupled to the nozzle head 260, the inner bore 238 of the heat sink 220 becomes seamless with the inner bore 268 of the nozzle head 260. In one embodiment, the inner bore 268 of the nozzle head 260 can be sized to accommodate a particular filament size.

The thermal locking member 270 is designed to be the exact same size as or just slightly larger than the thermal locking bore 240 positioned at the distal end 222 of the heat sink 220. In one embodiment, the thermal locking bore 240 is approximately 0.25% to 1.25% smaller than the thermal locking member 270. By way of example only, in an embodiment the thermal locking member 270 can be approximately 0.03 mm to 0.08 mm larger than the thermal locking bore 240. In an embodiment, the thermal locking member 270 and thermal locking bore 240 are joined via thermal locking. Specifically, the thermal locking bore 240 is heated to a temperature less than the melting points of the heat sink 220 and nozzle head 260 materials, causing expansion of the bore 240. In one embodiment, the bore 240 is heated to approximately 300° C. above room temperature. In yet another embodiment, the bore 240 is heated to achieve an approximately 1.25% expansion of the bore. Simultaneously or alternatively, the thermal locking member 270 is chilled by an approximately equal difference (in reference to room temperature), causing contraction of the thermal locking member 270. In an embodiment, the thermal locking member 270 is chilled to achieve an approximately 1.25% contraction of the thermal locking member 270. Immediately following heating and/or chilling, the thermal locking member 270 of the nozzle head 260 is inserted into the thermal locking bore 240 of the heat sink 220. As the thermal locking bore 240 cools to room temperature it contracts to its resting state. As the thermal locking member 270 warms to room temperature it expands to its resting state. The result is that the thermal locking member 270 is sealed against the walls of the thermal locking bore 240. In this way, the nozzle head 260 is permanently fixed to the heat sink 220.

The thermal locking member 270 is joined to the nozzle member 290 by a neck member 280. As illustrated in FIG. 2, the neck member 280 can be sized to substantially the dimensions of the inner bore 268 of the nozzle head 260. By way of example only, based on global standards, typically filament sizes can be 2.85 mm or 1.75 mm. The inner bore 268 can be shaped to the global standard size+standard deviation error+safety margin. Accordingly, in one embodiment, the inner bore 268 can be approximately 3.1 mm for a 2.85 mm filament, or approximately 2 mm for a 1.75 mm filament. The neck wall thickness can be approximately 1.5 mm to 0.35 mm. As such, the smaller the nominal diameter of the inner bore 268, the smaller the neck thickness (neck outer diameter), and vice versa. In another embodiment, the nozzle head 260 material (e.g., titanium) has a high yield strength and thus provides for the ability to manufacture substantially thin walls, such as the walls of the neck member 280. In this way, the neck member 280 creates a thermal break 250 between the heat sink 220 and the nozzle member 290. As such, the outer diameter of the neck member 280 may be slightly greater than a nominal diameter of the inner bore 268. The purpose of the thermal break 250 is to distance the heat sink 220 from the nozzle head 260 so that the heat sink 220 is not inadvertently heated by the nozzle head 260. In an embodiment, the thermal break 250 wall thickness is substantially small, with the only lower limitation on wall thickness being the need to maintain the mechanical integrity of the component. Such a small thermal break 250 ensures that the polymer filament 210 transitions from room temperature to melting temperature quickly and within a very short distance. This prevents the filament 210 from melting before it enters the nozzle head 260, thereby promoting an even flow of material into the nozzle head 260 and enhancing printing quality.

In an embodiment, the nozzle head 260 is entirely made of a material with thermal properties of high heat capacity and low rate of heat transfer. Such materials may include, but are not limited to, Titanium, Inconel®, Hastelloy®, or other high performance materials. Due to the thermal properties of these materials, the nozzle head 260 will maintain its high heat temperature in the interior, but have very poor heat conductance to the external environment. This is extraordinarily beneficial in that very little heat to no heat is transferred from the heated area of the nozzle member 290 into the thermal break 250 region, which further provides for the ability to design the nozzle head 260 with a substantially small thermal break 250. As explained above, this is a highly desirable property of the nozzle head 260.

In another embodiment, the nozzle head 260 is made of titanium. In addition to the afore-mentioned beneficial thermal properties, titanium is highly wear resistant and is able to resist abrasions that can be caused by particles in the filament 210. Titanium is also a high strength material, which means certain geometries of the nozzle head 260, such as the neck member 280, can be designed to be substantially thinner than what can be achieved by weaker metals, such as aluminum or brass. A thinner neck member 280 can slow heat transfer between the nozzle member 290 and the heat sink 220. Furthermore, titanium can also be coated with many different ceramic/diamond coatings that are not compatible with other metals. These coatings are beneficial in that they can decrease friction, prevent build up on bore walls, increase heat transfer to polymer, and promote even flow rates as material shears past the bore wall.

The distal end 262 of the nozzle head 260 includes an orifice 299, which is designed to be smaller than the nominal diameter of the inner bore 268.

In an embodiment, the entire monolithic nozzle head 260 functions as a heating block, which can heat the inner bore 268 of the nozzle head 260 to temperatures slightly greater than the melting point of a polymer filament 210. In an one embodiment, the nozzle member 290 is heated via heater cartridges (or cartridge heaters). FIG. 3A, by way of example only, illustrates an elevated perspective view of an embodiment of the monolithic nozzle head 260 where the nozzle member 290 is heated by heater cartridges 292. The monolithic nozzle head 260 can include any of the components of the nozzle systems disclosed herein, including those components described with respect to FIG. 2. In an embodiment, the nozzle member 290 of the monolithic nozzle head 260 includes two heater cartridge bores 298 (see the cross-sectional side view in FIG. 3B with the heater cartridges 292 omitted), which extend orthogonal to the proximal and distal ends of the nozzle member 290 and through the entirety of the nozzle member 290. In one embodiment, the bores 298 are separated by a distance of no less than approximately one filament diameter. The internal bore 268 of the nozzle head 260 runs between the two heater cartridge bores 298. The heater cartridges 292 each include a heating element 294, which is designed to mate with the heater cartridge bores 298 of the nozzle head 260. In one embodiment, the heating element 294 is the same dimensions as the heater cartridge bores 298. In another embodiment, the heating element 294 has a slightly larger diameter than the diameter of the heater cartridge bores 298. By way of example only, the heater cartridge bore 298 is approximately 0.25% to 1.25% smaller than the heating element. In an embodiment, the heating element 294 is mated to the heater cartridge bore 298 via thermal coupling. Specifically, the heater cartridge bores 298 are heated to a temperature less than the melting point of the nozzle head material, such as approximately 500° C., which causes the bores 298 to expand. In an embodiment, the bore 298 is heated to achieve an approximately 1.25% expansion. Simultaneously or alternatively, the heating element 294 can be chilled by an approximately equal difference (with reference to room temperature), such as approximately −50° C., which causes the heating elements 294 to contract. In one embodiment, the heating element 294 is chilled to achieve an approximately 1.25% contraction of the heating element 294. Following heating and chilling, the heating elements 294 are immediately inserted into the heater cartridge bores 298. As the heating cartridge bore 298 cools to room temperature it contracts to its resting state. As the heating element 294 warms to room temperature it expands to its resting state. In this way, the heating elements 294 are sealed against the walls of the heater cartridge bores 298, and dual heater cartridges 292 are permanently fixed to the nozzle member 290 of the nozzle head 260. Thus, two heater cartridges 292 can be coupled to the heater cartridge bores 298 for controlled heating of the internal bore 268 of the nozzle head 260. With this design, the use of redundant symmetrical heater cartridges 292 can allow for a more even application of heat to the internal bore 268 of the nozzle head 260. FIG. 4, by way of example only, illustrates a lower perspective view of a nozzle system with a monolithic nozzle head coupled to heater cartridges 292 permanently fixed to the nozzle member 290 of the nozzle head 260 via thermal coupling.

In an embodiment, glass bead thermistors can be mounted on the nozzle member 290 to track the temperature of the internal bore 268 within the nozzle member 290 for heat management. In another embodiment, in lieu of thermistors, the heater cartridges 292 can include internal robust and rigid thermocouple (bimetallic) elements. By placing the thermocouple elements inside the heater cartridges 292, there is a minimum amount of time lag between applied power and temperature measurements. There is also intimate/direct contact between the heating elements 294 and thermocouple elements, which provides for more accurate temperature measurements. In yet another embodiment, all heater cartridges/thermocouples can be manufactured in a factory environment, avoiding the labor and errors associated with on-hand assembly of multiple components. Furthermore, the use of dual heater cartridges/thermocouples provides for the ability to take redundant temperature measurements, which can more accurately identify system failures.

Figure 3:
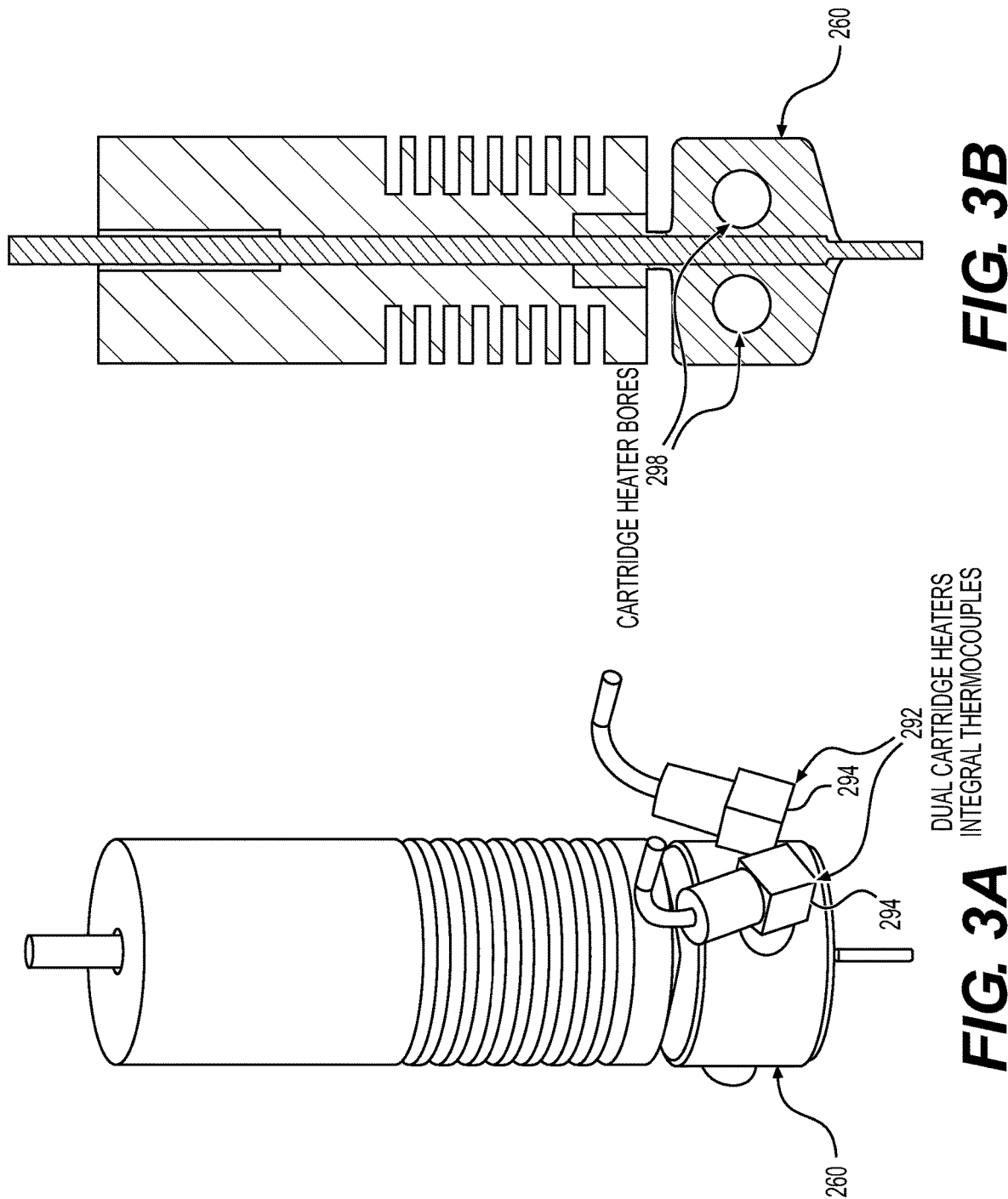
FIG. 3A illustrates an elevated perspective view of a nozzle system with a monolithic nozzle head coupled to heater cartridges, in accordance with an embodiment.
FIG. 3B illustrates a cross-sectional side view of a nozzle system with a monolithic nozzle head including heater cartridge bores, in accordance with an embodiment.
Figure 4:
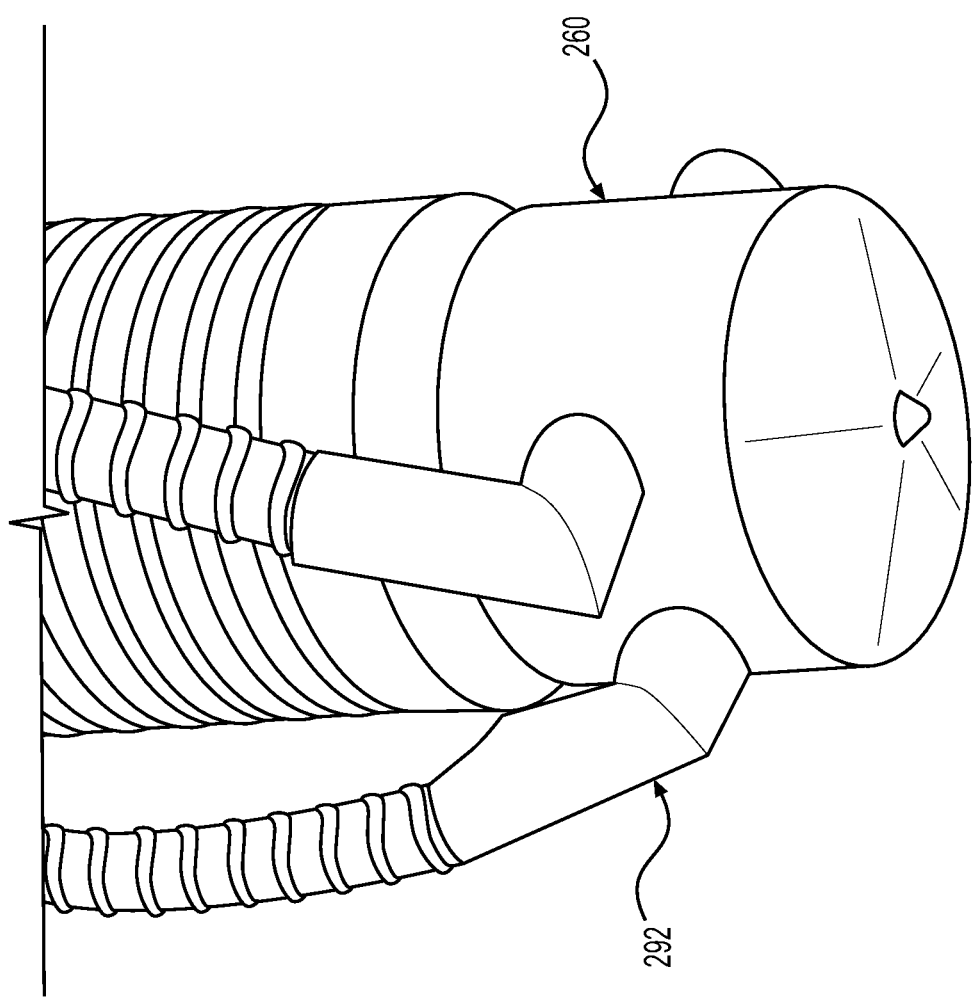
FIG. 4 illustrates a lower perspective view of a nozzle system with a monolithic nozzle head coupled to heater cartridges, in accordance with an embodiment.

The monolithic nozzle systems described herein, such as those illustrated in FIGS. 2-4, can be used in FFF additive manufacturing. In operation, a polymer filament 210 is pulled from a filament storage device by an extruder. Referring to FIG. 3, the extruder (not illustrated) can be connected to the proximal end 221 of the heat sink 220 via the threaded connection 237. The extruder can feed the polymer filament 210 into the internal bore 238 of the heat sink 220 at a controlled rate, which is determined by the computer system controlling the FFF additive manufacturing machine. The heat sink 220 maintains the polymer filament 210 at room temperature and in solid form as it moves through the inner bore 238 of the heat sink 220. The polymer filament 210 passes through the distal end 222 of the heat sink 220 and into the thermal break 250. Due to the low heat conductivity of the nozzle member 290, little to no heat from the nozzle member 290 penetrates the thermal break 250. Accordingly, the polymer filament 210 remains at or close to room temperature and in solid form even as it traverses the thermal break 250 into the nozzle member 290. The inner bore 268 within the nozzle member 290 is maintained at a temperature slightly above the melting point of the filament 210 by the heater cartridges 292. As the filament 210 is fed into the inner bore 268 of the nozzle member 290 from the thermal break 250 the filament 210 melts to form beads. The beads are squeezed through the orifice 299 at the end of the nozzle head 260, which is smaller than or equal to the nominal diameter of the filament 210. As the beads pass the orifice 299 and contact ambient air, the beads quickly harden as they are simultaneously deposited on the print surface.

Embodiments are directed to a nozzle system 200 for use in an additive manufacturing system for fabricating an object. The nozzle system 200 comprises a heat sink 220 having a heat sink proximate end 221 and a heat sink distal end 222. The nozzle system 200 also comprises a nozzle head 260 having a nozzle head proximate end 261 and a nozzle head distal end 262. The nozzle head 260 comprises a thermal locking member 270 positioned at the nozzle head proximate end 261. The nozzle head 260 also comprises a neck member 280. The nozzle head 260 further comprises a nozzle member 290 positioned at the nozzle head distal end 262. The nozzle member 290 is joined to the thermal locking member 270 via the neck member 280. The thermal locking member 270 is connected to the heat sink 220 at the heat sink distal end 222. An outer diameter of the neck member 280 is less than outer diameters of the thermal locking member 270 and the nozzle member 290. A combination of the thermal locking member 270, the neck member 280, and the nozzle member 290 is monolithic.

In an embodiment, the thermal locking member 270, neck member 280, and nozzle member 290 all comprise a metal selected from the group consisting of titanium, Inconel®, Hastelloy®, and a combination thereof.

In an embodiment, the heat sink 220 comprises a thermal locking bore 240 positioned at the heat sink distal end 222, and wherein the thermal locking member 270 is connected to the heat sink 220 via the thermal locking bore 240.

In an embodiment, the thermal locking member 270 is connected to the heat sink 220 via the thermal locking bore 240 via a thermal coupling connection.

In an embodiment, the nozzle head 260 further comprises a nozzle head inner bore 268 extending through the thermal locking member 270, the neck member 280, and the nozzle member 290 from the nozzle head proximate end 261 to the nozzle head distal end 262, and wherein the outer diameter of the neck member 280 is slightly greater than a nominal diameter of the nozzle head inner bore 268.

In an embodiment, the nozzle head 260 further comprises a nozzle head inner bore 268 extending through the thermal locking member 270, the neck member 280, and the nozzle member 290 from the nozzle head proximate end 261 to the nozzle head distal end 262, wherein the nozzle member 290 comprises two heater cartridge bores 298, and wherein the nozzle head inner bore 268 is positioned between the two heater cartridge bores 298.

In an embodiment, the nozzle system further comprises two heater cartridges 292, wherein each heater cartridge 292 comprises a heating element 294, and wherein each heating element 294 is connected to the nozzle member 290 within a corresponding one of the two heater cartridge bores 298.

In an embodiment, each heating element 294 is connected to the nozzle member 290 within the corresponding one of the two heater cartridge bores 298 via a thermal coupling connection.

Figure 5:
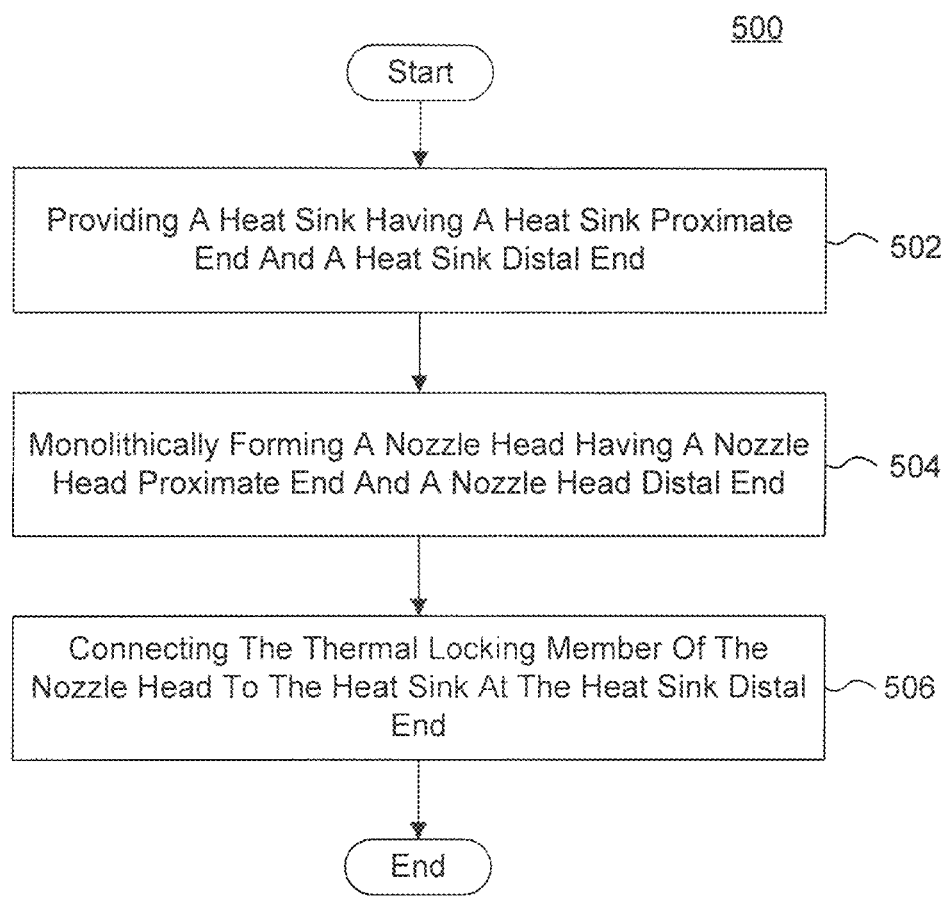
FIG. 5 is a flowchart illustrating an embodiment of a method of manufacturing a nozzle system.

Embodiments are also directed to a method of manufacturing a nozzle system for use in an additive manufacturing system for fabricating an object. FIG. 5, by way of example only, is a flowchart illustrating an embodiment of a method of manufacturing a nozzle system. The method comprises providing a heat sink having a heat sink proximate end and a heat sink distal end (block 502). The method also comprises monolithically forming a nozzle head having a nozzle head proximate end and a nozzle head distal end (block 504). The nozzle head comprises a thermal locking member positioned at the nozzle head proximate end. The nozzle head also comprises a neck member. The nozzle head further comprises a nozzle member positioned at the nozzle head distal end. The nozzle member is joined to the thermal locking member via the neck member. The method further comprises connecting the thermal locking member to the heat sink at the heat sink distal end (block 506). An outer diameter of the neck member is less than outer diameters of the thermal locking member and the nozzle member. The step of monolithically forming the nozzle head comprises monolithically forming the thermal locking member, the neck member, and the nozzle member in combination.

In an embodiment, the thermal locking member, neck member, and nozzle member all comprise a metal selected from the group consisting of titanium, Inconel®, Hastelloy®, and a combination thereof.

In an embodiment, the heat sink comprises a thermal locking bore positioned at the heat sink distal end, and wherein the step of connecting comprises connecting the thermal locking member to the heat sink via the thermal locking bore.

In an embodiment, the step of connecting the thermal locking member to the heat sink via the thermal locking bore is performed via thermal coupling.

In an embodiment, the nozzle head further comprises a nozzle head inner bore extending through the thermal locking member, the neck member, and the nozzle member from the nozzle head proximate end to the nozzle head distal end, and wherein the outer diameter of the neck member is slightly greater than a nominal diameter of the nozzle head inner bore.

In an embodiment, the nozzle head further comprises a nozzle head inner bore extending through the thermal locking member, the neck member, and the nozzle member from the nozzle head proximate end to the nozzle head distal end, wherein the nozzle member comprises two heater cartridge bores, and wherein the nozzle head inner bore is positioned between the two heater cartridge bores.

In an embodiment, the method further comprises providing two heater cartridges, wherein each heater cartridge comprises a heating element, and wherein the method further comprises connecting each heating element to the nozzle member within a corresponding one of the two heater cartridge bores.

In an embodiment, the step of connecting each heating element to the nozzle member within the corresponding one of the two heater cartridge bores is performed via thermal coupling.

There are numerous advantages to the nozzle systems disclosed herein. The one-piece monolithic design of the nozzle head integrates a number of nozzle components into one elegant package, including the nozzle member, thermal break, neck member, heater cartridges, and thermal locking member. This one-piece design eliminates redundant threaded features, and eliminates the problems associated with loosening and leakage of molten plastic from prior art clamps and threads. This design further ensures nearly perfect contact between the components, ensures high strength, eliminates the need for adhesives, prevents leaking and slipping, and improves thermal performance. The one-piece design also ensures that there is intimate contact between the heater cartridges and the nozzle member, which improves heat distribution in the inner bore of the nozzle member (i.e. the hot zone). Furthermore, the one-piece design allows for a thinner thermal break region, which slows the heat transfer between the hot zone (nozzle member) and cold zone (heat sink). This eliminates the need to use TEFLON® in the inner bore of the heat sink and nozzle head and allows for temperatures of up to 700° C. in the nozzle member. A one-piece design also improves the manufacturability of the nozzle system components, eliminating assembly errors.

Use of nozzle head materials with high heat capacity but low heat conductivity, such as titanium, also provides a number of advantages. First, the nozzle member of the nozzle head can be heated to extremely high temperatures, up to approximately 700° C., without compromising the integrity of the nozzle head. Second, due to the material's low heat conductivity, even at high temperatures very little heat escapes the inner bore of the nozzle member, preventing any undesirable heating of the polymer filament in the thermal break or heat sink. Third, these materials also have high strengths, making them resistant to abrasion and wear and tear that would otherwise occur during FFF additive manufacturing. Fourth, because these materials are high strength, they can also be shaped to thin geometries. As an example, the nozzle member's neck can be manufactured to as small as the dimensions of the inner bore of the nozzle head, which slows heat transfer from the nozzle member to the heat sink. Finally, materials such as titanium can be coated with many different ceramic/diamond coatings, which decrease friction, prevent build up on the bore wall, increase heat transfer to the polymer filament, and promote even flow rates as material shears past the bore wall.

The nozzle systems disclosed herein provide for substantially enhanced system reliability over prior art systems. Reliability is enhanced due to the elimination of multiple sources of errors that can be caused by human skill level, assembly repeatability, and manufacturing tolerances. By structuring the nozzle system design as one of permanently bonded components, there is virtually no variation that can be introduced into the system. The end result is superior heating and deposition of polymer filament during FFF additive manufacturing, greatly improving the quality of 3-D printing over prior art systems.

It's understood that the above description is intended to be illustrative, and not restrictive. The material has been presented to enable any person skilled in the art to make and use the concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the embodiments herein therefore should be determined with reference to the appended claims, along with the full scope of equivalents to which such claims are entitled. In the appended claims, the terms "including" and "in which" are used as the plain-English equivalents of the respective terms "comprising" and "wherein."

The method steps in any of the embodiments described herein are not restricted to being performed in any particular order. Also, structures mentioned in any of the method embodiments may utilize structures mentioned in any of the device embodiments. Such structures may be described in detail with respect to the device embodiments only but are applicable to any of the method embodiments.

Features in any of the embodiments described in this disclosure may be employed in combination with features in other embodiments described herein, such combinations are considered to be within the spirit and scope of the present invention.

The contemplated modifications and variations specifically mentioned in this disclosure are considered to be within the spirit and scope of the present invention.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. A method of using a nozzle system in an additive manufacturing system for fabricating an object, the method comprising:
    employing the nozzle system comprising:
        a heat sink having a heat sink proximate end and a heat sink distal end; and
        a nozzle head having a nozzle head proximate end and a nozzle head distal end, the nozzle head comprising:
            a thermal locking member positioned at the nozzle head proximate end;
            a neck member; and
            a nozzle member positioned at the nozzle head distal end, wherein the nozzle member is joined to the thermal locking member via the neck member;
        wherein the thermal locking member is connected to the heat sink at the heat sink distal end;
        wherein an outer diameter of the neck member is less than outer diameters of the thermal locking member and the nozzle member; and
        wherein a combination of the thermal locking member, the neck member, and the nozzle member is monolithic; and
    depositing, using the nozzle system, filament material on a print surface to fabricate the object.

2. The method of claim 1, wherein the thermal locking member, neck member, and nozzle member all comprise a metal selected from the group consisting of titanium, an austenitic nickel-chromium-based super alloy, a nickel-molybdenum-chromium alloy, and a combination thereof.

3. The method of claim 1, wherein the heat sink comprises a thermal locking bore positioned at the heat sink distal end, and wherein the thermal locking member is connected to the heat sink via the thermal locking bore.

4. The method of claim 3, wherein the thermal locking member is connected to the heat sink via the thermal locking bore via a thermal coupling connection.

5. The method of claim 1, wherein the nozzle head further comprises a nozzle head inner bore extending through the thermal locking member, the neck member, and the nozzle member from the nozzle head proximate end to the nozzle head distal end, and wherein the outer diameter of the neck member is slightly greater than a nominal diameter of the nozzle head inner bore.

6. The method of claim 1, wherein the nozzle head further comprises a nozzle head inner bore extending through the thermal locking member, the neck member, and the nozzle member from the nozzle head proximate end to the nozzle head distal end, wherein the nozzle member comprises two heater cartridge bores, and wherein the nozzle head inner bore is positioned between the two heater cartridge bores.

7. The method of claim 6, wherein the nozzle system further comprises two heater cartridges, wherein each heater cartridge comprises a heating element, and wherein each heating element is connected to the nozzle member within a corresponding one of the two heater cartridge bores.

8. The method of claim 7, wherein each heating element is connected to the nozzle member within the corresponding one of the two heater cartridge bores via a thermal coupling connection.

9. The method of claim 1, wherein the nozzle head further comprises a nozzle head inner bore extending through the thermal locking member, the neck member, and the nozzle member from the nozzle head proximate end to the nozzle head distal end, and wherein the method further comprises feeding a filament through the nozzle head inner bore to form the filament material.

10. The method of claim 9, wherein the heat sink comprises a heat sink inner bore, and wherein the method further comprises feeding the filament through the heat sink inner bore.

11. The method of claim 10, further comprising maintaining the filament at room temperature and in solid form as the filament is fed through the heat sink inner bore.

12. The method of claim 11, further comprising maintaining the filament at or close to room temperature and in solid form as the filament is fed through the nozzle head inner bore within the neck member.

13. The method of claim 12, further comprising maintaining the nozzle head inner bore within the nozzle member at a temperature slightly above a melting point of the filament to melt the filament to form the filament material.

14. The method of claim 13, further comprising squeezing the filament material through an orifice at the nozzle head distal end for the deposition on the print surface.

* * * * *